United States Patent [19]

Krawack

[11] Patent Number: 5,143,639
[45] Date of Patent: Sep. 1, 1992

[54] USE OF ($C_1$-$C_5$) ALKYL ESTERS OF ALIPHATIC ($C_8$-$C_{22}$) MONOCARBOXYLIC ACIDS FOR REMOVING FAT, INKS AND THE LIKE FROM PRINTING MACHINES

[75] Inventor: Børge Krawack, Højbjerg, Denmark

[73] Assignee: Aarhus Oliefabrik A/S, Aarhus C, Denmark

[21] Appl. No.: 671,807

[22] PCT Filed: Sep. 25, 1989

[86] PCT No.: PCT/DK89/00222
§ 371 Date: Mar. 26, 1991
§ 102(e) Date: Mar. 26, 1991

[87] PCT Pub. No.: WO90/03419
PCT Pub. Date: Apr. 5, 1990

[30] Foreign Application Priority Data

Sep. 26, 1988 [DK] Denmark ............................ 5331/88

[51] Int. Cl.$^5$ .......................... C11D 7/22; C11D 1/18; C23D 17/00
[52] U.S. Cl. ..................................... 252/162; 252/153; 252/170; 252/171; 252/DIG. 8; 134/38; 134/39; 134/40
[58] Field of Search ............... 252/153, 162, 170, 171, 252/DIG. 8; 134/38, 39, 40

[56] References Cited

U.S. PATENT DOCUMENTS

| | | |
|---|---|---|
| 3,814,698 | 6/1974 | Ferrara et al. ............... 252/DIG. 1 |
| 4,085,059 | 4/1978 | Smith et al. .................. 252/171 |
| 4,180,472 | 12/1979 | Mitchell et al. .................. 252/170 |
| 4,521,326 | 6/1985 | Seibert et al. .................. 252/170 |
| 4,707,293 | 11/1987 | Ferro .................. 252/170 |
| 4,774,017 | 9/1988 | Seibert et al. .................. 252/170 |

FOREIGN PATENT DOCUMENTS 1240469 8/1967 United Kingdom .

Primary Examiner—A. Lionel Clingman
Assistant Examiner—William S. Parks
Attorney, Agent, or Firm—Michael L. Dunn

[57] ABSTRACT

Use of ($C_1$-$C_5$) alkyl esters of aliphatic ($C_8$-$C_{22}$) monocarboxylic acids for removing fat, inks and the like from printing apparatus, in particular from offset printing machines, and a cleaning agent for this, containing as its main component a ($C_1$-$C_5$) alkyl ester of an aliphatic ($C_8$-$C_{22}$) monocarboxylic acid or a mixture of such esters.

The most suitable esters are methyl, ethyl or isopropyl esters or mixtures thereof, and particularly expedient is an ester mixture obtained by interesterification of an oleic acid containing oil or by esterification of an acid mixture having a corresponding composition.

The ester or ester mixture may be admixed with up to 50% by weight of vegetable oil.

Further, the ester or ester mixture or the mixture thereof with vegetable oil may be emulgated in water in such amount that the water phase comprises up to 50%, preferably 25-35% by weight of the emulsion using an emulsifier in an amount of 1-10%, preferably 3-5% by weight of the emulsion. In that case it is convenient to further add a corrosion inhibitor in an amount of up to 2%, preferably 0.5-1% by weight of the emulsion.

These esters and mixtures are low viscosity substances which are excellent and quickly acting solvents for inks, etc. They are moreover biologically degradable, non-toxic and have a low vapor pressure so that they do not involve any risk for the environment.

14 Claims, No Drawings

USE OF ($C_1$–$C_5$) ALKYL ESTERS OF ALIPHATIC ($C_8$–$C_{22}$) MONOCARBOXYLIC ACIDS FOR REMOVING FAT, INKS AND THE LIKE FROM PRINTING MACHINES

The invention concerns a special use of ($C_1$–$C_5$) alkyl esters of aliphatic ($C_8$–$C_{22}$) monocarboxylic acids for removing inks and the like from printing machines, in particular from offset printing machines. The invention also concerns an agent and a method for removing fat, inks and the like from printing machines, in particular from offset printing machines.

In the past white spirit, optionally in mixture with chlorinated hydrocarbons and/or with surfactants and optionally additionally dispersed in water, was generally used for cleaning printing machines of fat, inks and the like.

The cleaning was effected by spraying the cleaning agent onto the uppermost inking roller. With the machine running, the cleaning agent was dispersed downwards over the other rollers and was removed by means of a washing doctor clamped to the bottom roller. After a couple of sprayings with the cleaning agent the rollers were clean. The cleaning operation was ended by spraying the rollers with water, and then the machine was ready for printing again. In special cases at was necessary to wipe the rollers with a clean cloth. Now and then it was also necessary to wipe the printing plate and the rubber blanket with a cloth moistened with the cleaning agent.

Owing to the harmful effects on the environment of using white spirit, kerosine or other mineral oil products it has been attempted to use other substances having corresponding properties. E.g., in the graphic industry it has been attempted to use liquid fatty oils, e.g. soy bean oil, for cleaning offset printing machines of ink. Such cleaning is effected in the same way as described above. However, strong cloth rubbing on the rollers is also necessary for the oil to be able to dissolve all the ink, and the process must often be repeated several times to obtain clean rollers. This is caused partly by the high viscosity of the oil, partly by the low dissolution rate.

Methylester of fatty acids have been used for aqueous cleaning purposes. U.S. Pat. No. 4,180,472 discloses compositions and methods for removing oily soils from fabrics in an aqueous washing process. The compositions consist of 20–97% alkanes or fatty acid esters and 3–30% emulsifiers. The concentration of the alkanes or fatty acid esters is from about 0.1 to about 3% in the aqueous washing medium.

British Patent No. 1 240 769 discloses an aqueous composition suitable for cleaning metal, glass and painted surfaces. The composition contains inorganic or organic acids, for instance 50% concentrated phosphoric acid, cationic emulsifiers and small amounts of oily substances, for instance fatty acid esters, which are added to increase the viscosity of the composition and increase the adhesive properties. The composition may be diluted with water before application in a ratio of from 1:2 to 1:10 by volume.

Japanese Patent No. 81 035 716-B discloses a non-aqueous composition and method for removing scales of soap on the inside wall of heat exchangers. The composition consists of a mixture of fatty acids and their methyl esters, and the cleaning is performed at 100°–130° C.

It has surprisingly been found that all the above-mentioned drawbacks in the cleaning of printing machines, in particular offset printing machines are obviated by using, according to the invention, a ($C_1$–$C_5$) alkyl ester or an aliphatic ($C_8$–$C_{22}$) monocarboxylic acid or a mixture of such esters. With such agent the cleaning can be performed in the same way as described above using cleaning agents based on organic solvents.

Generally, the best results are obtained by using the ester or ester mixture alone.

In certain cases cleaning of offset printing machines may cause a weak film to be formed on the "Rilsan" ® rollers so that some ink is transferred to the wetting device and ink the filt rollers. This may be counteracted by dissolving a small amount, up to 10% by weight, of one or more surfactants in the ester or ester mixture.

Thus it is preferred according to the invention to use the ester or ester mixture containing up to 10%, preferably 0.5–2% by weight of surfactant.

It is also possible according to the invention to use a mixture of the ester or ester mixture with up to 50% by weight of vegetable oil, said mixture optionally containing up to 10% by weight of surfactant.

The above agents may further, according to the invention, be emulgated in water in such amount that the water phase comprises up to 50%, preferably 25–35% by weight of the emulsion, using an emulsifier in an amount of 1–10%, preferably 3–5% by weight of the emulsion. In that case it is convenient to further add a corrosion inhibitor in an amount of up to 2%, preferably 0.5–1% by weight of the emulsion.

Oil-in-water emulsions of the ($C_1$–$C_5$) alkyl esters of aliphatic ($C_8$–$C_{22}$) monocarboxylic acids generally have a much higher viscosity than the neat esters. However, the emulsions are readily dispersed on the printing machines, and they are removed without difficulty by rinsing with water after the cleaning operation.

Thus, in a general sense, use according to the invention may be made of a mixture comprising 50–100% by weight of a ($C_1$–$C_5$) alkyl ester of an aliphatic ($C_8$–$C_{22}$) monocarboxylic acid or mixture of such esters, 0–50% by weight of vegetable oil and 0–10%, preferably 0.5–2% by weight of surfactant, said mixture being optionally emulgated in water in such amount that the water phase comprises up to 50%, preferably 25–35% by weight of the emulsion, using an emulsifier in an amount of 1–10 %, preferably 3–5% by weight of the emulsion and optionally adding a corrosion inhibitor in an amount of up to 2%, preferably 0.5–1% by weight of the emulsion.

Particularly suited for use according to the invention are esters which are liquid at room temperature.

The most suitable esters for use according to the invention are methyl, ethyl or isopropyl esters or mixtures thereof, and particularly useful is the methyl ester.

According to the invention, the fatty acid esters may be saturated, but particularly useful are ester mixtures comprising esters of unsaturated fatty acids, such as oleic, linoleic, linolenic and erucic acid.

Esters containing unsaturated fatty acids have a particularly low melting point, but to obtain improved stability against oxidation partially hydrogenated esters may be used, the content of polyunsaturated fatty acids having been reduced by partial hydrogenation of the esters or of the fatty acids or fats used in the production of the esters.

Also esters of ricinoleic acid may be used according to the invention.

The present esters can be produced in a known manner by esterification of a suitable ($C_8$-$C_{22}$) monocarboxylic acid or a mixture of such acids with a ($C_1$-$C_5$) alcohol. They can also be produced in a known manner by interesterification of a suitable fat (triglyceride) with a ($C_1$-$C_5$) alcohol, optionally after preceding fractionation of the fat or by fractionation of the ester mixture to provide mixtures having particularly desirable properties.

It is particularly expedient, both with respect to composition and price, to use an ester mixture obtained by interesterification of an oleic acid containing oil or by esterification of a fatty acid mixture having a corresponding composition. The oleic acid containing oil may advantageously be selected from soy bean oil, rapeseed oil, olive oil, sunflower oil, cottonseed oil, palm oil, palm kernel oil, and coconut oil.

When liquid, these esters are low viscosity substances which, after cleaning of the printing machines, can easily be removed again without leaving an oil film. They are likewise excellent and quickly acting solvents for inks, etc.

The esters are biologically degradable, and they are not toxic. Thus, the methyl esters have an $LD_{50}$ greater than 10 g/kg body weight for rats. They have such a low vapour pressure at room temperature that the vapours do not have any discomforting effect when inhaled.

The esters moreover have such a high flash point that they can be transported, stored and used without fire danger problems.

The vegetable oils which can be used in admixture with the ($C_1$-$C_5$) alkyl esters of aliphatic ($C_8$-$C_{22}$) monocarboxylic acids include soy bean oil, rapeseed oil, sunflower oil, cottonseed oil and low-melting fractions of palm oil, palm kernel oil and coconut oil and mixtures thereof. Coconut oil, palm kernel oil and palm oil may be used in amounts of 0-25% by weight. A content of 5-15% by weight of these oils or mixtures thereof is especially convenient, as higher contents increase the viscosity of the agent making it more difficult to remove from the printing machines after the cleaning operation.

A suitable class of surfactants for use according to the invention is of the type of polyglycol ethers of aliphatic ($C_8$-$C_{22}$) alcohols.

A suitable class of emulsifiers for preparing aqueous emulsions for use according to the invention is of the type of saturated ($C_{12}$-$C_{22}$) fatty alcohols ethoxylated with 7-14, in particular 9-12, ethoxy groups.

As examples of corrosion inhibitors to be added to the aqueous emulsions may be mentioned aliphatic primary amines having 12-18 carbon atoms.

The invention further concerns an agent for removing, inks and the like from printing machines, in particular from offset printing machines, which is characterized in that as a main component it comprises a ($C_1$-$C_5$) alkyl ester of an aliphatic ($C_8$-$C_{22}$) monocarboxylic acid or a mixture of such esters.

More specifically the agent according to the invention consists of a mixture comprising 50-100% by weight of a ($C_1$-$C_5$) alkyl ester of an aliphatic ($C_8$-$C_{22}$) monocarboxylic acid or mixture of such esters, 0-50% by weight of vegetable oil and 0-10%, preferably 0.5-2% by weight of surfactant, said mixture being optionally emulgated in water in such amount that the water phase comprises up to 50%, preferably 25-35% by weight of the emulsion, using an emulsifier in an amount of 1-10 %, preferably 3-5% by weight of the emulsion and optionally adding a corrosion inhibitor in an amount of up to 2%, preferably 0.5-1% by weight of the emulsion.

As mentioned above the most suitable esters to form all or part of the agent according to the invention are methyl, ethyl or isopropyl esters or mixtures thereof, and particularly expedient are the above mentioned ester mixtures obtained from oleic acid containing fats and being liquid at ambient temperature.

The vegetable oils, surfactants, emulsifiers and corrosion inhibitors to be included in the agent according to the invention are preferably of the types discussed above.

The agent according to the invention may advantageously contain 0.05-10% by weight of one or more surfactants. If a surfactant is added to the cleaning agent, it will most generally contain 0.4-2% by weight, and preferably 1-1.5% by weight of surfactant.

The agent according to the invention may moreover contain various stabilizers, e.g. preservatives and antioxidants, which might be deemed necessary or desirable.

As an example it may be mentioned that methyl esters of fatty acids from rapeseed oil have the following physical data:

Vapour pressure: 0.027 Pa at 40° C.
Viscosity: 0.007 Pa.s at 25° C.
Flash point: >150° C.
Cold haze point: <−15° c.
Toxicity, $LD_{50}$: >20 g/kg body weight (rats)

With this ester mixture excellent results in the cleaning of an offset printing machine of ink have been obtained. The ink could easily be washed off without leaving any film on the rollers and without any discomfort to the operator at all.

In certain cases with a tendency to film formation on the "Rilsan" ® roller, this could be avoided completely by addition of 1-1.5% by weight of the surfactant "Dehydol ® LT7" (heptaethylene glycol monolauryl ether). However, usually this is not necessary to obtain a good function of the product.

The amount of agent to be used in each cleaning operation varies much, according to which colour shift it is desired to make, and how much remains on the rollers. An offset printing machine comprises 3-5, in special cases 7, inking apparatuses, one per colour used. When using the agent according to the invention ordinarily 150-250 ml is sprayed on the uppermost roller of the inking apparatus, and often one spraying is sufficient.

When using a solvent-based cleaning agent normally 300-500 ml is sprayed on the uppermost roller of the inking apparatus, and if necessary, the spraying is repeated.

EXAMPLE

Rapeseed oil methyl ester was used for six months for cleaning a plurality of offset printing machines of the Heidelberg make installed at a technical school.

The inking rollers were cleaned by spraying with the rapeseed oil methyl ester, and then the ester with dissolved ink residues was removed by means of a washing doctor. Any greasy film on the rollers was removed by pouring water on the rollers and removing the water with the washing doctor.

When rubber blanket cylinder and printing plate were washed, small ester residues were left now and then, causing tinting tendencies. The residues were easily removed by wiping with a cloth, application of water with a sponge and finally drying with a dry cloth.

The cleaning process is analogous to the previously used cleaning process using agents containing solvents. The amount of solvent-containing cleaning agent to be used was approximately twice as large, and in spite of exhaust at each machine unpleasant concentrations of solvent vapours were present in the printing room.

The labour involved by cleaning with rapeseed oil methyl ester was significantly reduced. Thus, after printing with black ink cleaning once with the ester was sufficient, while the solvent-based cleaning agents usually neccessitates cleaning two or three times.

COMPARATIVE EXAMPLE

Tests with cleaning of offset printing machines by means of soy bean oil have been performed. Here too, the atmosphere in the printing room was improved, but the colour residues were dissolved so slowly that it was necessary to rub the rollers with cloths, and the cleaning often had to be repeated before the rollers were clean. Even then an oil film remains on the rollers and has to be removed by other means.

I claim:

1. A method of removing ink from a printing machine which comprises cleaning the machine with an agent comprised of 50-100% by weight of ($C_1$-$C_5$) alkyl ester of an aliphatic ($C_8$-$C_{22}$) monocarboxylic acid, 0-50% by weight of vegetable oil and 0-10% by weight of surfactant.

2. A method of removing ink from a printing machine which comprises cleaning the machine with an emulsion comprised of the agent of claim 1 emulsified in water in such amount that the water phase comprises up to 50% by weight of the emulsion, and an emulsifier in an amount of 1-10% by weight of emulsion.

3. A method of removing ink from a printing machine which comprises cleaning the machine with the agent of claim 1, wherein the alkyl ester is a mixture of alkyl esters.

4. A method of removing ink from a printing machine which comprises cleaning the machine with the emulsion of claim 2, wherein the emulsion contains a corrosion inhibitor in an amount of up to 2% by weight of the emulsion.

5. A method of removing ink from a printing machine which comprises cleaning the machine with the emulsion of claim 2, wherein the water comprises 25-35% by weight of the emulsion.

6. A method of removing ink from a printing machine which comprises cleaning the machine with the emulsion of claim 5, wherein the emulsifier comprises 3-5% by weight of the emulsion.

7. A method of removing ink from a printing machine which comprises cleaning the machine with the agent of claim 3, wherein the ester mixture has been obtained by esterification of an oleic acid containing oil.

8. A method of removing ink from a printing machine which comprises cleaning the machine with the agent of claim 1, wherein the agent contains a vegetable oil which is a low-melting fraction of palm oil, palm kernel oil, coconut oil or mixtures thereof.

9. A method of removing ink from a printing machine which comprises cleaning the machine with the agent of claim 1, wherein the vegetable oil is palm oil, palm kernel oil, coconut oil or a mixture thereof in an amount of 5-15% by weight of the agent.

10. A method of removing ink from a printing machine which comprises cleaning the machine with emulsion of claim 4, wherein the corrosion inhibitor comprises an aliphatic primary amine having 12-18 carbon atoms.

11. A method according to claim 1 wherein the cleaning agent is sprayed onto the uppermost roller of such printing machine, running the machine to disperse the agent downwards over other rollers and removing the agent with dissolved ink by means of a washing doctor clamped to a bottom roller.

12. A method according to claim 2 wherein the emulsion is sprayed onto an uppermost roller of such printing machine, running the machine to disperse the agent downwards over other rollers and removing the agent with dissolved ink by means of a washing doctor clamped to a bottom roller.

13. A method for removing inks from a printing machine which comprises cleaning the machine with an agent comprising at least one ($C_1$-$C_5$) alkyl ester of an aliphatic ($C_8$-$C_{22}$) monocarboxylic acid.

14. The method of claim 3, wherein the mixture of alkyl esters is obtained by interesterification of an oil selected from the group consisting of soybean oil, rapeseed oil, olive oil, sunflower oil, cottonseed oil, palm oil, palm kernel oil and coconut oil, with a ($C_1$-$C_5$) alcohol.

* * * * *